US012248816B2

(12) United States Patent
Verma et al.

(10) Patent No.: US 12,248,816 B2
(45) Date of Patent: Mar. 11, 2025

(54) TECHNIQUES FOR DEPLOYING CHANGES TO IMPROVE RELIABILITY OF A CLOUD SERVICE

(71) Applicant: Microsoft Technology Licensing, LLC, Redmond, WA (US)

(72) Inventors: Nidhi Verma, Redmond, WA (US); Rahul Nigam, Bothell, WA (US); Rohan Khanna, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 471 days.

(21) Appl. No.: 17/573,481

(22) Filed: Jan. 11, 2022

(65) Prior Publication Data

US 2023/0222001 A1 Jul. 13, 2023

(51) Int. Cl.
*G06F 9/50* (2006.01)
*G06F 8/656* (2018.01)

(52) U.S. Cl.
CPC .......... *G06F 9/505* (2013.01); *G06F 8/656* (2018.02); *G06F 9/5038* (2013.01)

(58) Field of Classification Search
None
See application file for complete search history.

(56) References Cited

U.S. PATENT DOCUMENTS 9,154,366 B1 * 10/2015 Martin ............... H04L 69/329
10,289,403 B1 * 5/2019 Krishnaswamy ......... G06F 8/71
11,068,252 B2 7/2021 Rajagopalan et al.
11,074,058 B1 7/2021 Mowatt et al.
11,151,161 B2 10/2021 Dageville et al.
11,157,253 B1 10/2021 Shteyman et al.

(Continued)

FOREIGN PATENT DOCUMENTS

CN 109582335 A 4/2019
CN 110708345 A 1/2020

OTHER PUBLICATIONS

Roth, et al., "Configure backups on secondary replicas of an Always On availability group", Retrieved from: https://docs.microsoft.com/en-us/sql/database-engine/availability-groups/windows/configure-backup-on-availability-replicas-sql-server?view=sql-server-ver15, Dec. 1, 2021, 11 Pages.

(Continued)

*Primary Examiner* — Adam Lee
(74) *Attorney, Agent, or Firm* — NovoTechIP International PLLC

(57) ABSTRACT

A data processing system implements obtaining a set of input parameters associated with an update to be deployed to a plurality of server farms of a cloud-based service, wherein each server farm includes a primary replica configured to handle user traffic and a disaster recovery replica configured to handle user traffic responsive to a failure of the primary replica; determining temperature information for each of the server farms, ranking the server farms based on the temperature information to determine an order in which an update is to be deployed to the server farms; iteratively deploying the updates to the primary replicas of the server farms according to the ranking until an deployment threshold has been satisfied; and iteratively deploying the updates to the primary replicas of server farms for which the primary replicas have not yet been updated and to the disaster recovery replicas of the server farms.

17 Claims, 17 Drawing Sheets

(56) References Cited

U.S. PATENT DOCUMENTS

| | | | |
|---|---|---|---|
| 2002/0116605 A1* | 8/2002 | Berg | H04L 67/14 |
| | | | 713/1 |
| 2007/0061470 A1* | 3/2007 | Berg | H04L 67/1017 |
| | | | 709/227 |
| 2007/0288710 A1* | 12/2007 | Boyd | G06F 11/2071 |
| | | | 714/E11.102 |
| 2008/0172572 A1* | 7/2008 | Beardsley | G06F 11/2082 |
| | | | 714/E11.098 |
| 2012/0310887 A1 | 12/2012 | Taranov et al. | |
| 2014/0282934 A1* | 9/2014 | Miasnik | H04W 4/02 |
| | | | 726/5 |
| 2015/0363190 A1* | 12/2015 | Bhatia | G06F 3/04842 |
| | | | 717/172 |
| 2017/0063986 A1* | 3/2017 | Gopal | H04L 67/1095 |
| 2017/0222910 A1* | 8/2017 | Cai | H04L 43/16 |
| 2018/0097694 A1* | 4/2018 | Raz | H04L 67/10 |
| 2019/0303127 A1* | 10/2019 | Krishnaswamy | H04L 43/16 |
| 2020/0326919 A1 | 10/2020 | Kaler et al. | |
| 2020/0379744 A1 | 12/2020 | Bhupati et al. | |
| 2021/0279145 A1 | 9/2021 | Dings et al. | |
| 2021/0357246 A1 | 11/2021 | Kumar et al. | |

OTHER PUBLICATIONS

"International Search Report and Written Opinion Issued in PCT Application No. PCT/US22/048331", Mailed Date: Feb. 14, 2023, 15 Pages.

* cited by examiner

Ranking of the Server Farms:

(1) Server Farm 2: Primary Replica: Temp 115
(2) Server Farm 7: Primary Replica: Temp 170
(3) Server Farm 4: Primary Replica: Temp 331
(4) Server Farm 15: Primary Replica: Temp 380
(5) Server Farm 3: Primary Replica: Temp 440
(6) Server Farm 8: Primary Replica: Temp 445
(7) Server Farm 6: Primary Replica: Temp 555
(8) Server Farm 5: Primary Replica: Temp 560
(9) Server Farm 1: Primary Replica: Temp 650
(10) Server Farm 11: Primary Replica: Temp 696
(11) Server Farm 13: Primary Replica: Temp 1315
(12) Server Farm 9: Primary Replica: Temp 1830
(13) Server Farm 10: Primary Replica: Temp 2110
(14) Server Farm 14: Primary Replica: Temp 2300
(15) Server Farm 12: Primary Replica: Temp 3300
(16) Server Farm 3: Secondary Replica: Temp 60
(17) Server Farm 7: Secondary Replica: Temp 70
(18) Server Farm 5: Secondary Replica: Temp 90
(19) Server Farm 11: Secondary Replica: Temp 100
(20) Server Farm 2: Secondary Replica: Temp 120
(21) Server Farm 15: Secondary Replica: Temp 120
(22) Server Farm 4: Secondary Replica: Temp 121
(23) Server Farm 8: Secondary Replica: Temp 210
(24) Server Farm 9: Secondary Replica: Temp 225
(25) Server Farm 6: Secondary Replica: Temp 325
(26) Server Farm 1: Secondary Replica: Temp 345
(27) Server Farm 13: Secondary Replica: Temp 610
(28) Server Farm 14: Secondary Replica: Temp 710
(29) Server Farm 10: Secondary Replica: Temp 775
(30) Server Farm 12: Secondary Replica: Temp 1000

FIG. 4

TECHNIQUES FOR DEPLOYING CHANGES TO IMPROVE RELIABILITY OF A CLOUD SERVICE

BACKGROUND

Cloud-based services provide computing services over the Internet or a dedicated network. The cloud-based services may provide computing resources, analytics, storage, and network resources to customers. These services may include, but are not limited to, applications for creating, consuming, and/or modifying content, file storage and management platforms, collaboration and communications platforms, and other types of software as a service. The architecture of a typical cloud-based service includes numerous servers, network devices, and storage elements to support the services provided. These devices include software, data, and configuration files that need to be periodically updated to add new features, to deploy fixes to software, and/or to deploy new configuration data.

Cloud-based services provide fail-over protections that supply redundancy that permits the cloud-based services to quickly recover from faults. This redundancy may be achieved by implementing a primary replica configured to handle user traffic and one or more disaster recovery replicas. The primary replica is implemented by a logical grouping of virtual machines operating a first set of servers referred to an availability set. Each disaster recovery replica is associated with a respective logical grouping of virtual machines operating on a respective set of servers different from the primary replica and the other secondary replicas. The disaster recovery replicas are implemented on separate hardware from the primary replica so that a disaster recovery replica can take over processing of user traffic in the event of hardware, software, and/or network failure, power loss, or other issues that cause the primary replica to become unavailable. The disaster recovery replicas are kept synchronized with the primary replica to permit the disaster recovery replica to seamlessly take over for the primary replica in the event of a failure.

Updates are typically rolled out in multiple stages across the cloud-based services. Both the primary replica the one or more disaster recovery replicas are typically updated concurrently. However, this approach can introduce a problematic update to both the primary and disaster recovery replicas, resulting in both the primary and disaster recovery replicas failing. Hence, there is a need for improved systems and methods for deploying updates to cloud services.

SUMMARY

An example data processing system according to the disclosure may include a processor and a machine-readable medium storing executable instructions. The instructions when executed cause the processor to perform operations including obtaining a set of input parameters associated with an update to be deployed to a plurality of server farms of a cloud-based service, each server farm including a primary replica configured to handle user traffic and a disaster recovery replica configured to handle the user traffic upon a failure of the primary replica, the input parameters including a deployment threshold indicating a percentage of the plurality of server farms for which the primary replica is updated prior to updating the disaster recovery replica of the plurality of server farms; determining temperature information for each of the plurality of server farms, the temperature information including a first temperature associated with the primary replica and a second temperature associated with the disaster recovery replica configured to handle the user traffic upon a failure of the primary replica, the first temperature representing a load on the primary replica and the second temperature representing a load on the disaster recovery replica; ranking the server farms based on the temperature information to determine an order in which an update is to be deployed to the server farms; iteratively deploying the update to the primary replica of the plurality of server farms according to the ranking until the deployment threshold has been satisfied; and iteratively deploying the update to the primary replicas of server farms for which the primary replica has not yet been updated and to the disaster recovery replicas of the plurality of server farms.

An example method implemented in a data processing system for deploying updates to a cloud-based service includes obtaining a set of input parameters associated with an update to be deployed to a plurality of server farms of a cloud-based service, each server farm including a primary replica configured to handle user traffic and a disaster recovery replica configured to handle the user traffic upon a failure of the primary replica, the input parameters including a deployment threshold indicating a percentage of the plurality of server farms for which the primary replica is updated prior to updating the disaster recovery replica of the plurality of server farms; determining temperature information for each of the plurality of server farms, the temperature information including a first temperature associated with the primary replica and a second temperature associated with the disaster recovery replica configured to handle the user traffic upon a failure of the primary replica, the first temperature representing a load on the primary replica and the second temperature representing a load on the disaster recovery replica; ranking the server farms based on the temperature information to determine an order in which an update is to be deployed to the server farms; iteratively deploying the update to the primary replica of the plurality of server farms according to the ranking until the deployment threshold has been satisfied; and iteratively deploying the update to the primary replicas of server farms for which the primary replica has not yet been updated and to the disaster recovery replicas of the plurality of server farms.

An example machine-readable medium on which are stored instructions. The instructions when executed cause a processor of a programmable device to perform operations of obtaining a set of input parameters associated with an update to be deployed to a plurality of server farms of a cloud-based service, each server farm including a primary replica configured to handle user traffic and a disaster recovery replica configured to handle the user traffic upon a failure of the primary replica, the input parameters including a deployment threshold indicating a percentage of the plurality of server farms for which the primary replica is updated prior to updating the disaster recovery replica of the plurality of server farms; determining temperature information for each of the plurality of server farms, the temperature information including a first temperature associated with the primary replica and a second temperature associated with the disaster recovery replica configured to handle the user traffic upon a failure of the primary replica, the first temperature representing a load on the primary replica and the second temperature representing a load on the disaster recovery replica; ranking the server farms based on the temperature information to determine an order in which an update is to be deployed to the server farms; iteratively deploying the update to the primary replica of the plurality of server farms according to the ranking until the deployment threshold has been satisfied; and iteratively deploying the update to the primary replicas of server farms for which the primary replica has not yet been updated and to the disaster recovery replicas of the plurality of server farms.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 show an example ranking of the server farms showing in FIGS. 3A, 3B, 3C, D3, 3E, 3F, 3G, 3H, 3I, and 3J based on the temperatures of the primary replica and the disaster recovery replica.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for an improved deployment process for improved reliability of cloud-based services are provided. These techniques include improved processes for deploying updates to the primary replica and one or more disaster recovery replicas to provide improved time to mitigate (TTM), redundancy, and availability of services. These techniques provide an improvement over current approaches for deploying updates in a cloud-based service by selectively deploying the updates to the primary replicas until a configurable threshold percentage of the primary replicas supported by the cloud-based service have been updated. The threshold may be user configurable. Alternatively, the threshold may be automatically configured based on a deployment model that is configured to predict an optimal threshold of primary replica updated based on deployment parameters. The deployment parameters may include information identifying which elements of the cloud-based service are to be updated, a risk associated with the update, the audience or scope of the update, a type of update to be performed, and/or other information associated with the update. A technical benefit of this deployment is in significant improvement of the user experience for users of the cloud-based service by ensuring that updates improve the functionality and stability of the cloud-based service. These and other technical benefits of the techniques disclosed herein will be evident from the discussion of the example implementations that follow.

Figure 1:
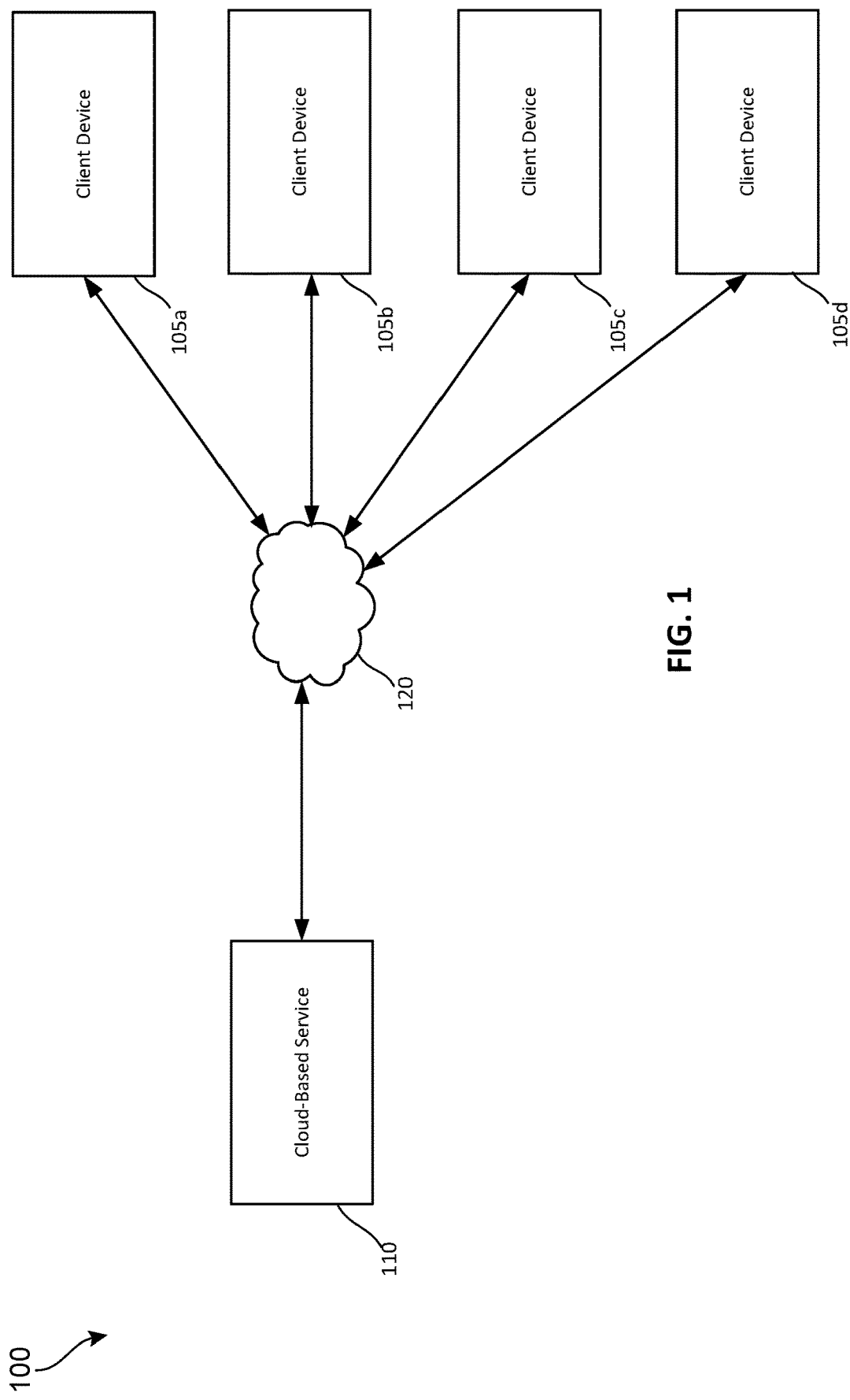
FIG. 1 is a diagram showing an example computing environment in which the techniques provided herein may be implemented.

FIG. 1 is a diagram showing an example computing environment 100 in which the techniques for generating deployment policies for improved reliability of cloud-based services are provided may be implemented. The computing environment 100 may include a cloud-based service 110 that implements the techniques for generating and executing centralized deployment policies described herein. The example computing environment 100 may also include one or more client devices, such as the client devices 105a, 105b, 105c, and 105d. The client devices 105a, 105b, 105c, and 105d may communicate with the cloud-based service 110 via the network 120. The network 120 may be a dedicated private network and/or the combination of public and private networks commonly referred to as the Internet.

In the example shown in FIG. 1, the cloud-based service 110 is implemented as a cloud-based service or set of services. These services may include, but are not limited to, applications for creating, consuming, and/or modifying content, file storage and management platforms, collaboration and communications platforms, and other types of software as a service. The cloud-based service 110 may include numerous servers, network devices, storage elements and other components to support the various services that are provided by the cloud-based service 110. For example, the cloud-based service 110 may include one or more collections of computer servers, referred to as a server farm, which are configured to provide computational and/or storage resources for at least a portion of the services provided by the cloud-based service 110. The server farm may be configured to provide fail-over protection so that if a computer server within the server farm experiences a failure, the tasks assigned to that server are handed off to another computer server within the farm. The server farm may also be configured to such that one or more machines may be taken offline temporarily to facilitate updates to the software and/or configuration data of the servers. This handoff may be achieved by implementing a primary replica and at least one disaster recovery replica that can seamlessly take over for the primary replica in the event of a failure of the primary replica. Furthermore, the cloud-based service 110 may also include other hardware and software to support various processes and services that support and maintain the various components of the cloud-based service 110.

In some implementations, the deployment policy generation and execution functionality described as being implemented by the cloud-based service 110 may instead be implemented as a separate service (not shown in FIG. 1) that is configured to handle the deployment policy generation and execution for the cloud-based service 110 and/or other such services. In such an implementation, the deployment policy and generation and execute functionality may be offered as another cloud-based service.

The client devices 105a, 105b, 105c, and 105d (referred to collectively as client device 105) are computing devices that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 1 includes four client devices, other implementations may include a different number of client devices that may utilize the cloud-based service 110. Furthermore, in some implementations, features of the services provided by the cloud-based service 110 may be implemented by a native application installed on the client device 105, and the native application may communicate with the cloud-based service 110 over a network connection to exchange data with the cloud-based service 110 and/or to access features implemented on the cloud-based service 110.

Figure 2:
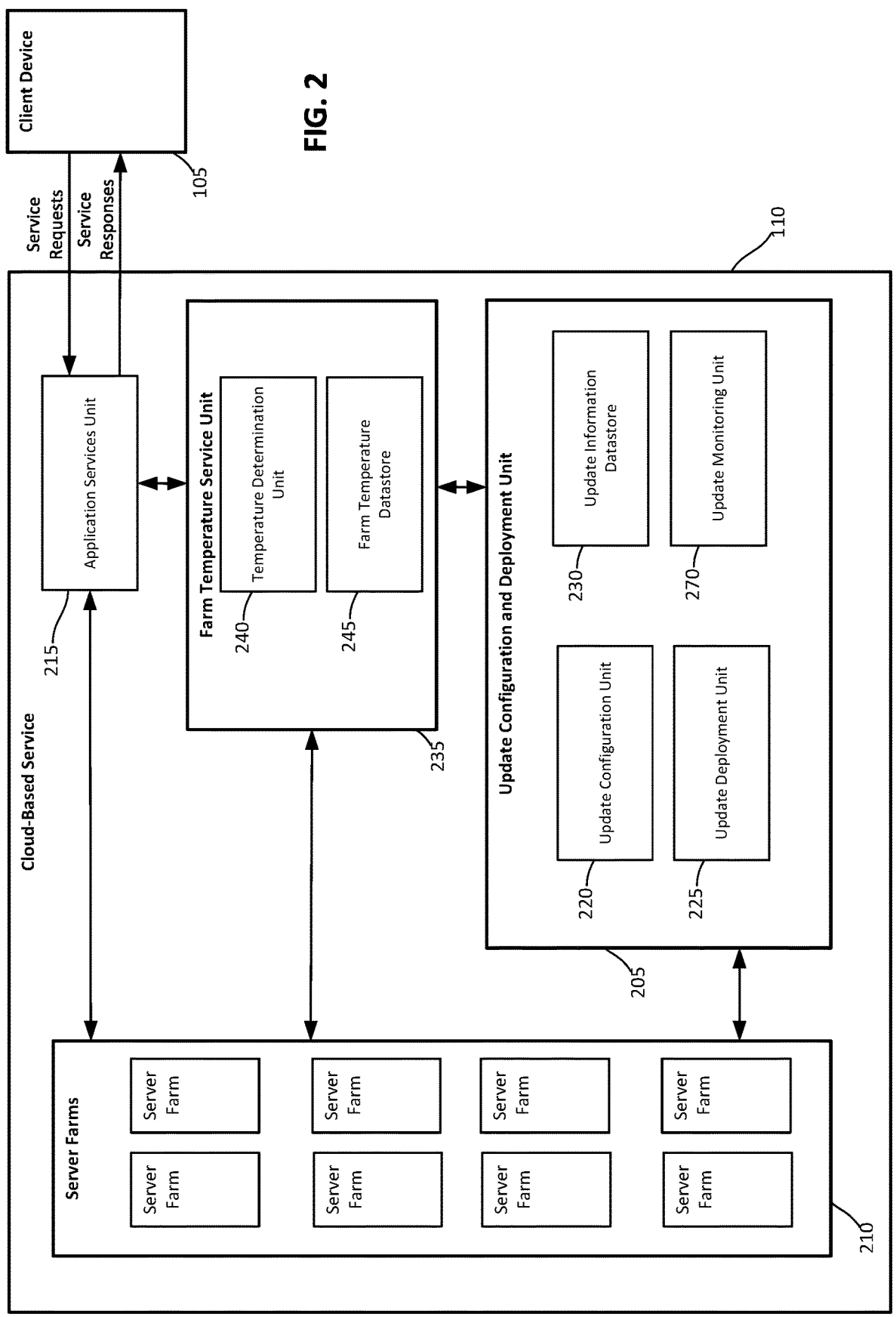
FIG. 2 is a diagram showing an example implementation of the cloud-based service shown in FIG. 1.

FIG. 2 is an example architecture that may be used, at least in part, to implement the cloud-based service 110. The cloud-based service 110 may include an update configuration and deployment unit 205, an application services unit 215, a farm temperature service unit 235, and a plurality of server farms 210.

The application services unit 215 may be configured to provide the various services offered to customers of the cloud-based service 110. The application service unit 305 may be configured to receive service requests from the client devices 105 of users and to provide service responses to the client devices 105 of the users. The specific types of services provided by the cloud-based service 110 may vary. These services may include, but are not limited to, providing applications for creating, consuming, and/or modifying content, file storage and management platforms, collaboration and communications platforms, and other types of software as a service. The application services unit 215 may be configured to route service requests to an appropriate server farm of the plurality of server farms 210.

The farm temperature service unit 235 may be configured to determine a "temperature" representing a load on each of the server farms 210. The farm temperature service unit 235 may include a temperature determination unit 240 and a farm temperature datastore 245. The temperature determination unit 240 may calculate the temperature for each of the server farms based on various operation parameters of the server farm, which may include, but is not limited to, CPU utilization, memory utilization, requests per second (RPS) being received by the server farm, the current capacity of the server farm, and/or other operating parameters of the server farm that may be indicative of the load on server farm. The temperature determination unit 240 may be configured to determine a separate temperature for the primary replica and the one or more disaster recovery replicas on the server farm. The farm temperature service unit 235 may periodically obtain operating parameter information from the server farms 210 and store this information in the farm temperature datastore 245. The farm temperature datastore 245 is a persistent datastore for storing temperature information that may be updated and queried by temperature determination unit 240. The temperature determination unit 240 may periodically calculate the temperature for the primary replica and each of the one or more disaster recovery replicas for each of the server farms by obtaining the operating parameter information for that server farm from the temperature determination unit 240. The calculated temperatures may be stored in the temperature datastore 245.

The temperature service unit 235 may be configured to respond to requests for temperature information for the server farms 210 from the application services unit 215. The application services unit 215 may use this information to determine which farm has capacity for handling user requests where such requests may be distributed across multiple server farms. The temperatures may also be used by the update configuration and deployment unit 205 to determine an order in which the updates may be deployed to the server farms 210.

The update configuration and deployment unit 205 may be configured to provide a means for configuring and deploying updates to the server farms 210 of the cloud-based service. The update configuration and deployment unit 205 may include an update configuration unit 220, an update deployment unit 225, an update information datastore 230, and an update monitoring unit 270.

The update configuration unit 220 is configured to provide a user interface that permits an administrator to configure and initiate the deployment of an update to a cloud-based service, such as the cloud-based service 110. The update configuration unit 220 may create a deployment policy for the update based on the deployment configuration parameters received. The update configuration unit 220 may implement a user interface that may be presented on the client device 105 of the administrator. An example of such a user interface is shown in FIG. 5.

Figure 5:
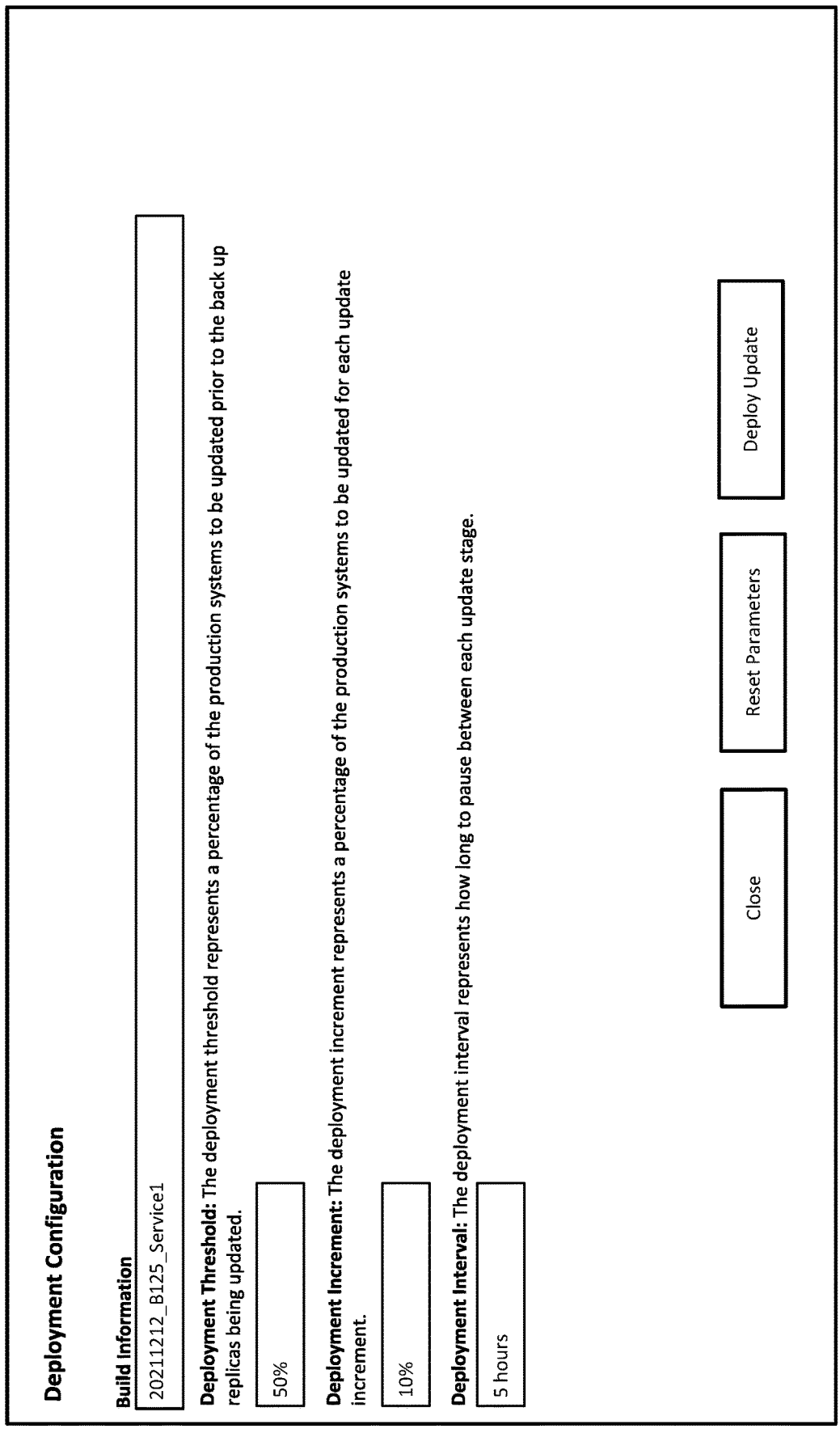
FIG. 5 is an example user interface that may be used to configure the deployment of updates to a cloud-based service.

FIG. 5 is a diagram of an example user interface 500 that may be used by an administrator to configure various parameters associated the deployment of an update to the server farms 210 of the cloud-based service 110. In this example, the administrator may configure a deployment threshold, a deployment increment, and a deployment interval for the deployment. The deployment threshold represents a percentage of the primary replicas of the server farms that should be first updated before any updates are made to the one or more disaster replicas. The server farms are updated incrementally, and the deployment increment represents how many server farms may be updated in a particular phase of the deployment of the update. The deployment increment may be expressed as an integer value representing the number of server farms to be updated for each phase of the deployment. Alternatively, the deployment increment may represent a percentage of the total number of server farms to which the update is to be deployed. The deployment interval represents an amount of time to wait between each phase of the deployment in which the update is deployed to another set of server farms.

This incremental approach allows for the update to rolled out initially on the servers supporting the primary replica on the server farm. A technical benefit of this approach is that it ensures that at least one functional disaster recovery replica remains operational on each server farm while the update is incrementally deployed to the servers supporting the primary replica on the server farm. The primary replica continues to service user requests, which provides an opportunity to discover any problems that may have been introduced by the update. Once the incremental updates to the primary replicas have been made to the percentage of the server farms indicated by the deployment threshold, the update may be incrementally deployed to the one or more disaster replicas. The updates may be applied to both the primary replica and the one or more disaster recovery replicas incrementally to ensure that if a problem occurs with the update, the one or more disaster recovery replicas are not completely taken offline by the problem. Furthermore, by the time the update is deployed to the one or more disaster replicas, the update configuration and deployment unit 205 should have collected enough performance information to ensure that the build is working reliability and the updates have not introduced any major problems into the cloud-based service 110.

Another technical benefit of this approach is that the deployment threshold, the deployment interval, and the deployment increment parameters may be adjusted to account for the risk associated with a particular upgrade. The risk associated with deploying an upgrade may be determined at least in part based on the complexity of the upgrade, the audience or scope of the upgrade, which elements of the cloud-based service are being upgraded, and/or other factors that may impact the risk of deploying the upgrade on the cloud-based service 110. The size of the audience or scope of the upgrade may reflect which customers may be negatively impacted by the upgrade. A change to a feature used by a small number of users is far less risky than a change to a feature used by large corporate customers and/or large percentage of the userbase. If the update introduces a regression, in which a feature that was previously working stops working, and that feature is used by many customers, then a significant portion of the userbase may experience a poor user experience. The risk associated with an update that introduces a new feature that does not impact any current features may be determined to be less risky than updating an existing feature.

The complexity of the update also impacts the risk associated with deploying the update to cloud-based services. While all updates should be thoroughly tested before deploying the updates to the cloud-based services, a complex update may inadvertently introduce a regression that is not detected in the pre-deployment testing. Thus, more complex updates that make significant changes to the software and/or configuration of elements of the cloud-based service may be associated with a higher risk. Upgrades to certain components of the cloud-based service 110 may also be associated with a higher risk.

In some implementations, the update configuration unit 220 may provide suggested values for the deployment threshold, the deployment increment, and the deployment interval. The update configuration unit 220 may be configured to suggest default values for the deployment threshold, the deployment increment, and the deployment interval based on the type of update being deployed. The update configuration unit 220 may map the type of build to set of default values. The mappings may be stored in the update information datastore 230. In other implementations, a machine learning model may be trained to output suggested values for the deployment threshold, the deployment increment, and the deployment interval based on the type of update being deployed. The machine learning model may be trained using training data generated by analyzing the data collected from previous update deployments. The machine learning model may be configured to receive information about the deployment, such as the software and/or data to be updated, the number of users and/or a percentage of the userbase that utilize the features to be updated, and/or other attributes that may be indicative of the risk and/or complexity of the update.

The update information datastore 230 is a persistent datastore that may be used to store information for updates to be the server farms 210. The update configuration unit 220 may be configured to store the deployment policy information obtained by the update configuration unit 220. The update information datastore 230 may also be used to store information about the status of the deployment of an update. The update deployment unit 225 may update the information associated with an update as the update is incrementally deployed to server farms of the cloud-based service 110.

The update deployment unit 225 is configured to execute the deployment policy for the build. The update may be launched substantially immediately by the administrator by the via the deployment configuration user interface 400. The user interface 400 may also provide a means for scheduling the deployment to be initiated on a specific date and time. The update deployment unit 225 may be configured to deploy the updates according to the deployment threshold, deployment increment, and the deployment interval indicated in the deployment policy.

The update deployment unit 225 is configured to obtain farm temperature information from the farm temperatures service unit 235 for the server farms to which the update is to be deployed. The update deployment unit 225 may be configured to rank the server farms based on the current temperature of the server farms when determining the order at which the farms are updated. The temperature information associated with the farms may include a temperature associated with the primary replica and the temperature associated with the one or more disaster recovery replicas. The update deployment unit 225 may rank the farms differently at different phases of the deployment. Initially, the update deployment unit 225 deploys to the primary replicas of server farms until the percentage of primary replicas updated across the cloud-based service 110 reaches the deployment threshold. During this phase, the update deployment unit 225 may rank the server farms to be updated based on the temperature of the primary replica and select server farms in which the primary replica having a lowest temperature as the next server farm to be updated. The update deployment unit 225 may update a percentage of the server farms indicated by the deployment increment in each phase of the deployment. The update deployment unit 225 may wait for the period indicating the deployment interval between each incremental update.

Once the update deployment unit threshold has been reached, the update deployment unit may begin updating both the primary replica and the one or more secondary replicas of the server farms. The update deployment unit 225 may rank the server farms that have not yet been updated based on the temperature of the primary replica and the temperature of the one or more disaster recovery replicas. The temperatures of the primary replicas may be rated more heavily than the temperatures of the one or more disaster recovery replicas when determining the temperatures of the server farms to be updated. Those server farms having a lower temperature may have the updated deployed to the primary replica and the one or more secondary replicas of the server farms. The second phase may include one or more incremental updates in which the update is deployed to additional server farms according to the deployment increment.

The update deployment unit 225 may then deploy the updates to any remaining disaster replicas that have not yet bene updated in the third phase of deployment. The update deployment unit 225 may rank the server farms for which the one or more disaster replicas are to be updated based on the temperature of the one or more disaster replicas. Once the update deployment unit 225 has completed the deployment of the updates, the update deployment unit 225 may send a report to an administrator indicating that the deployment has completed.

The update monitoring unit 270 may be configured to receive status information indicating the state of each of the server farms of the server farms 210. In some implementations, various elements of the primary replica and the one or more disaster recovery replicas may be configured to send telemetry data to the update configuration and deployment unit 205, and the build monitoring unit 270 may analyze the telemetry data to determine whether the build is operating correctly. The update monitoring unit 270 may also be configured to send a signal to the update deployment unit 225 to cause the update deployment unit 225 to halt further deployment of the update. The update monitoring unit 270 may also initiate remedial measures to cause the updates to be backed out to return the servers which were updated to a previous configuration in response to determining that the update is not operating as expected.

Figure 3A:
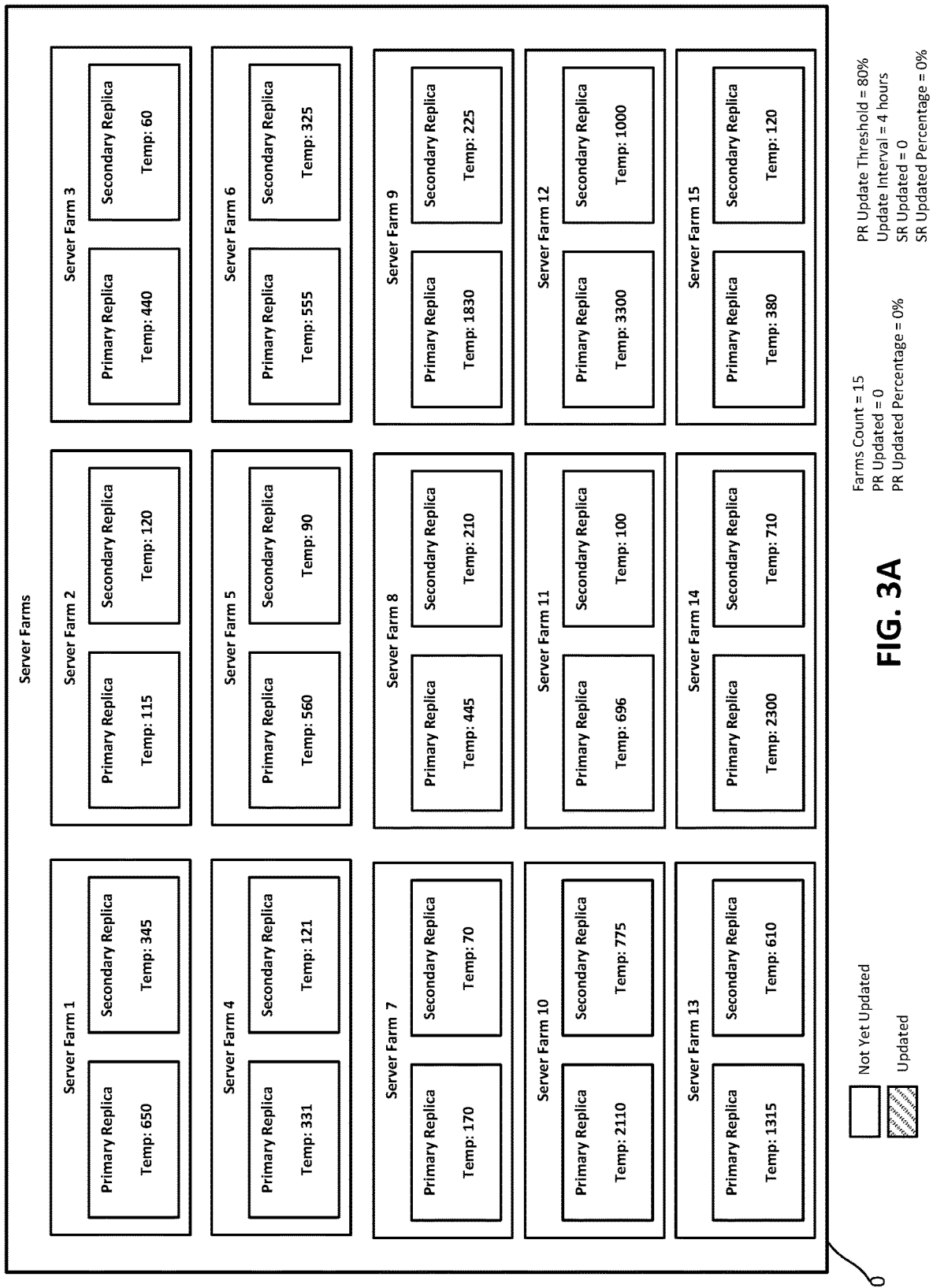
FIGS. 3A, 3B, 3C, 3D, 3E, 3F, 3G, 3H, 3I, and 3J are diagrams showing an example of deploying updates on the server farms of the cloud-based service shown in the preceding examples according to the techniques provided herein.
Figure 3B:
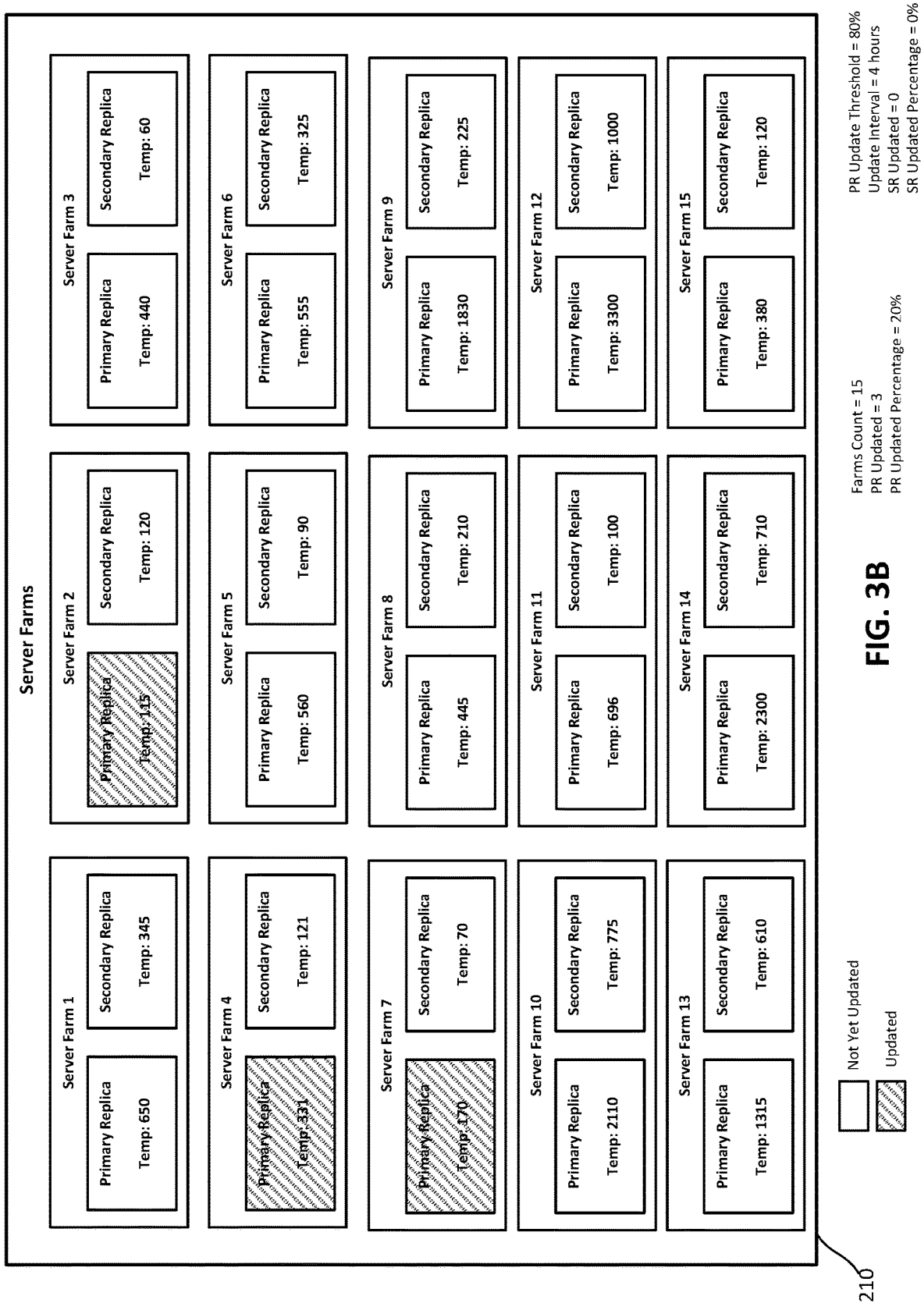
Figure 3C:
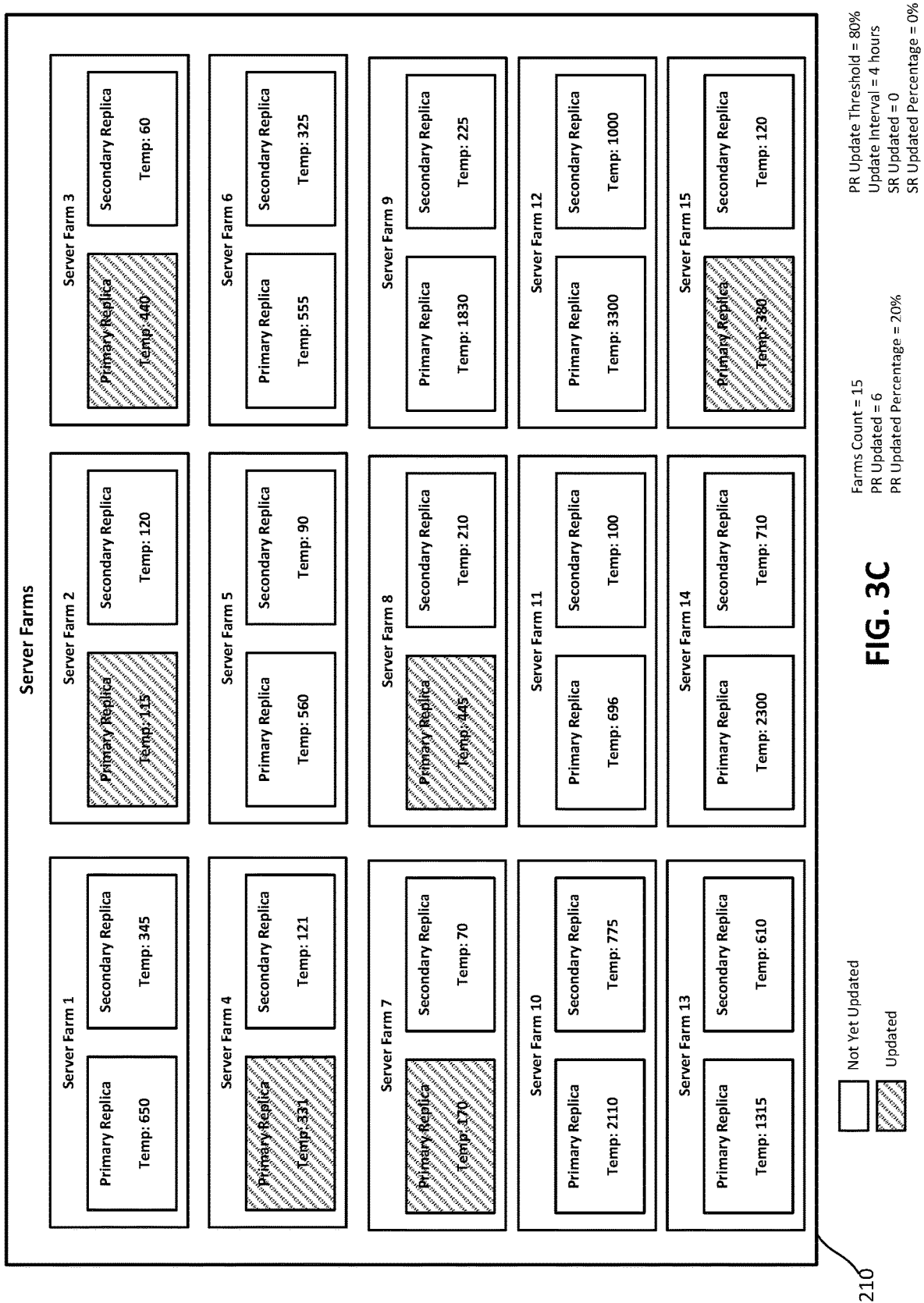

FIGS. 3A, 3B, 3C, D3, 3E, 3F, 3G, 3H, 3I, and 3J are diagrams showing an example of deploying updates on the server farms 210 of the cloud-based service 110 shown in the preceding examples according to the techniques provided herein. FIG. 3A shows an initial state of the server farms 210 before the update has been deployed. In this example, each server farm includes a primary replica and a disaster recovery replica. The temperatures associated with the primary replica and the disaster recovery replica are also shown. The temperatures may be obtained from the farm temperature service unit 235 by the update configuration and deployment unit 205 of the cloud-based service 110. In the example implementation shown in FIGS. 3A-3J, the temperatures of the farm are kept constant to more clearly illustrate the techniques herein. However, in other implementations, the temperatures of the primary replicas and the disaster recovery replicas may be updated periodically, and the update configuration, and deployment unit 205 may redetermine the order in which the update is deployed to server farms 210. Furthermore, the example implementation of the server farms 210 includes only fifteen server farms. However, other implementation may include a different number of server farms. The server farms may also be distributed at multiple geographical locations to reduce latency in responding to customer traffic and to provide redundancy in the event of a disaster at one of the geographical locations.

FIG. 4 shows an example ranking of the server farms of FIGS. 3A-3J based on the temperatures of the primary replica and the disaster recovery replica of the server farms. The update deployment unit 225 of the update configuration and deployment unit 205 may calculate this ranking based on the temperatures of the primary replica and the disaster recovery replica of each of the server farms. The update deployment unit 225 may also obtain the update configuration information from the update information datastore 230. In the example shown in FIGS. 3A-3J and 4, the deployment threshold is 80%, the deployment increment is 20%, and the deployment interval is 4 hours. The deployment increment and the deployment interval have been kept constant in this example implementation. However, in other implementations, the deployment increment and/or the deployment interval may be changed once the deployment threshold for updating the primary replica of server farm has been satisfied. For example, the deployment increment may be increased and/or the deployment interval may be decreased once the deployment threshold has been satisfied.

In FIG. 3B, the update deployment unit 225 has deployed the update to primary replica of server farms 2, 7, and 4, respectively. The update deployment unit 225 selects 20% of the server farms to be updated based on the deployment increment. The update deployment unit 225 selects the three server farms having the lowest temperatures for their respective primary replicas. No updates are made to the disaster recovery replicas at this point in the deployment process because the deployment threshold has not yet been satisfied. The update deployment unit 225 then waits for the four hours of the deployment interval before proceeding to the next iteration of the deployment process In FIG. 3C, the update deployment unit 225 has deployed the update to primary replica of server farms 15, 3, and 8, respectively. The update deployment unit 225 once again selects 20% of the server farms to be updated based on the deployment increment. The update deployment unit 225 selects the three server farms having the lowest temperatures for their respective primary replicas that have not yet been updated. 40% of the server farms have now had their primary replicas updated. No updates are made to the disaster recovery replicas at this point in the deployment process because the deployment threshold has not yet been satisfied. The update deployment unit 225 then waits for the four hours of the deployment interval before proceeding to the next iteration of the deployment process.

Figure 3D:
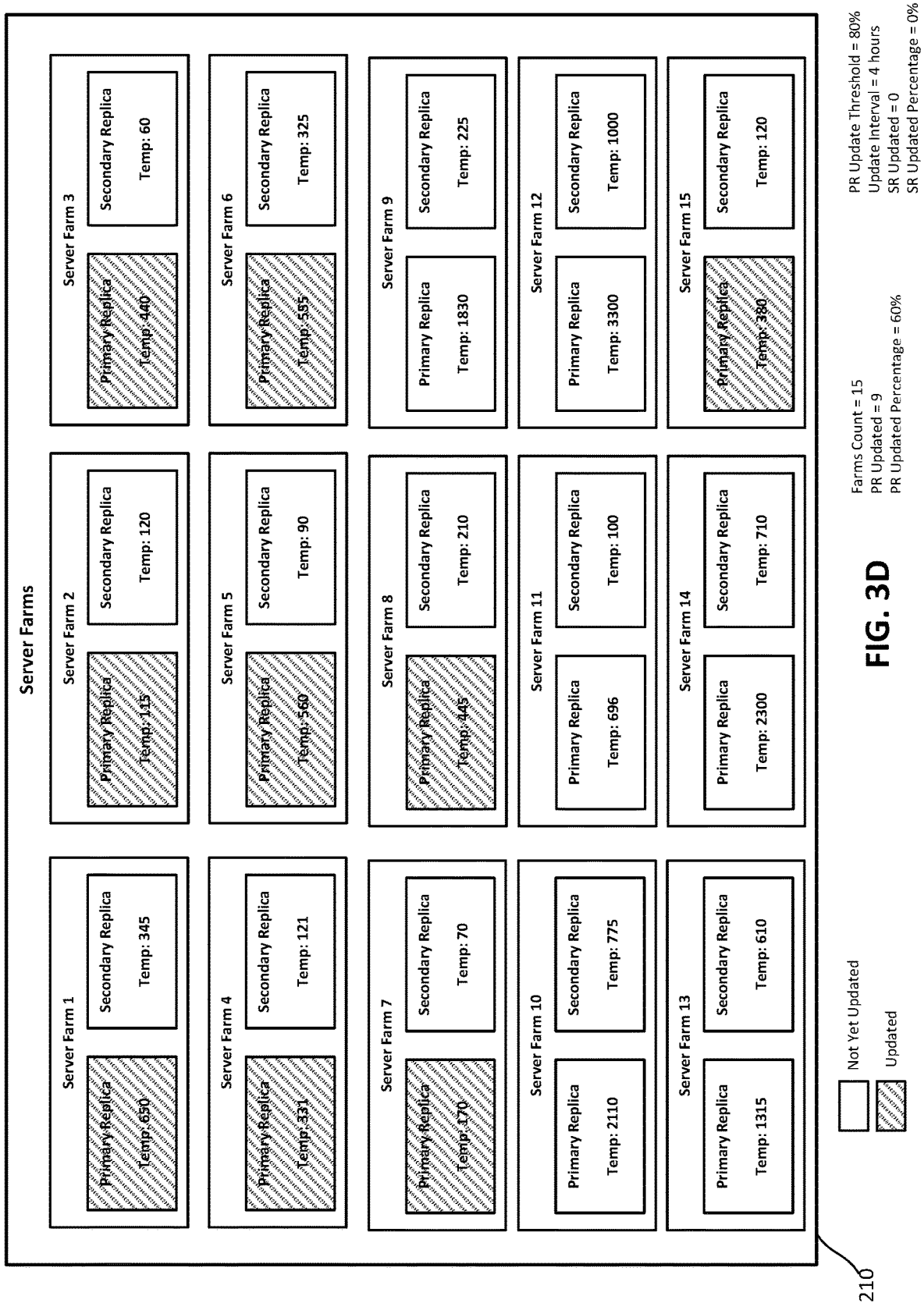

In FIG. 3D, the update deployment unit 225 has deployed the update to primary replica of server farms 6, 5, and 1, respectively. The update deployment unit 225 once again selects 20% of the server farms to be updated based on the deployment increment. The update deployment unit 225 selects the three server farms having the lowest temperatures for their respective primary replicas that have not yet been updated. 60% of the server farms have now had their primary replicas updated. No updates are made to the disaster recovery replicas at this point in the deployment process because the deployment threshold has not yet been satisfied. The update deployment unit 225 then waits for the four hours of the deployment interval before proceeding to the next iteration of the deployment process.

Figure 3E:
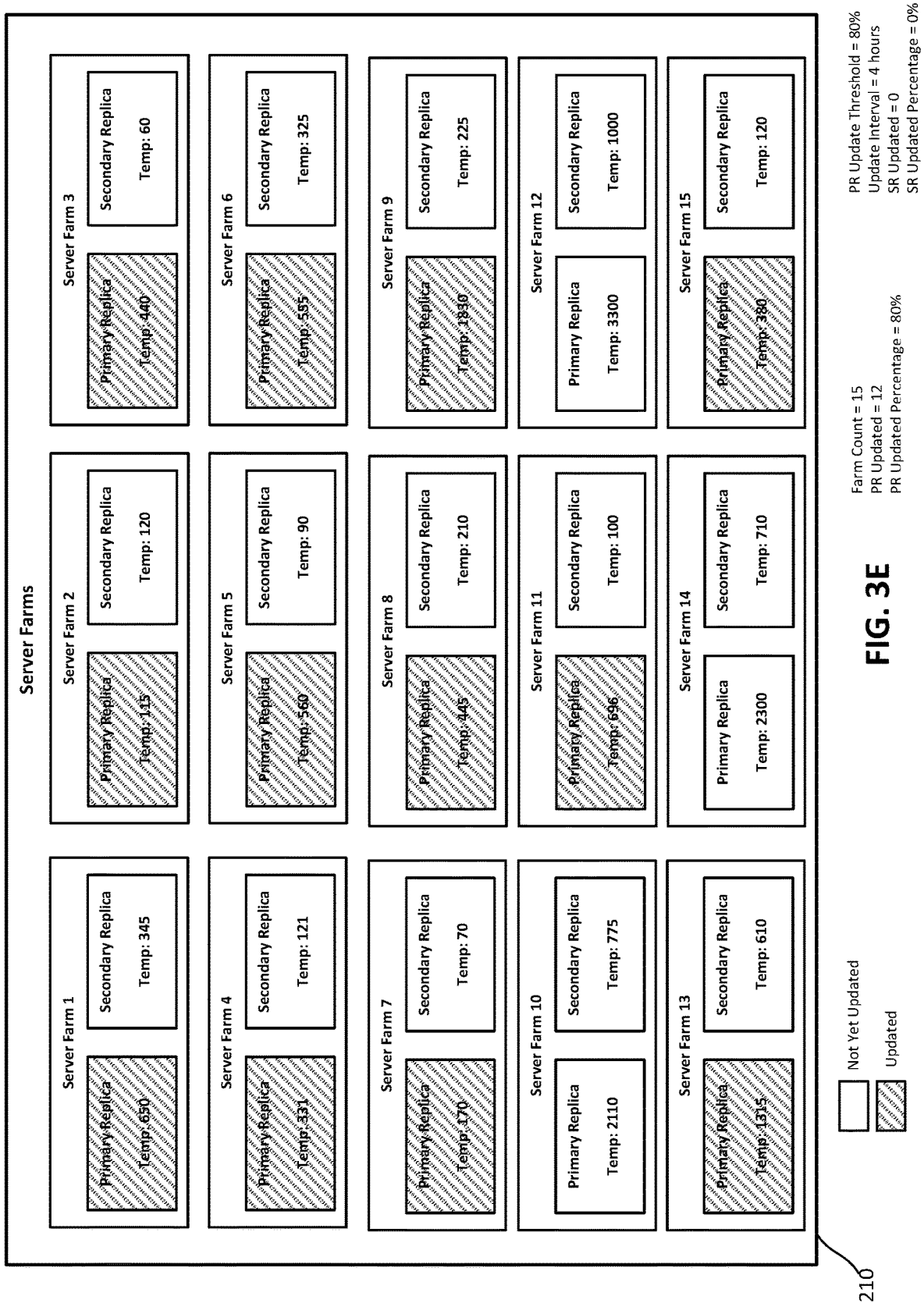

In FIG. 3E, the update deployment unit 225 has deployed the update to primary replica of server farms 11, 13, and 9, respectively. The update deployment unit 225 once again selects 20% of the server farms to be updated based on the deployment increment. The update deployment unit 225 selects the three server farms having the lowest temperatures for their respective primary replicas that have not yet been updated. 80% of the server farms have now had their primary replicas updated. No updates are made to the disaster recovery replicas at this point in the deployment process. But the deployment threshold has been satisfied, and the secondary replicas may be updated in the next iteration of the deployment process. The update deployment unit 225 then waits for the four hours of the deployment interval before proceeding to the next iteration of the deployment process.

Figure 3F:
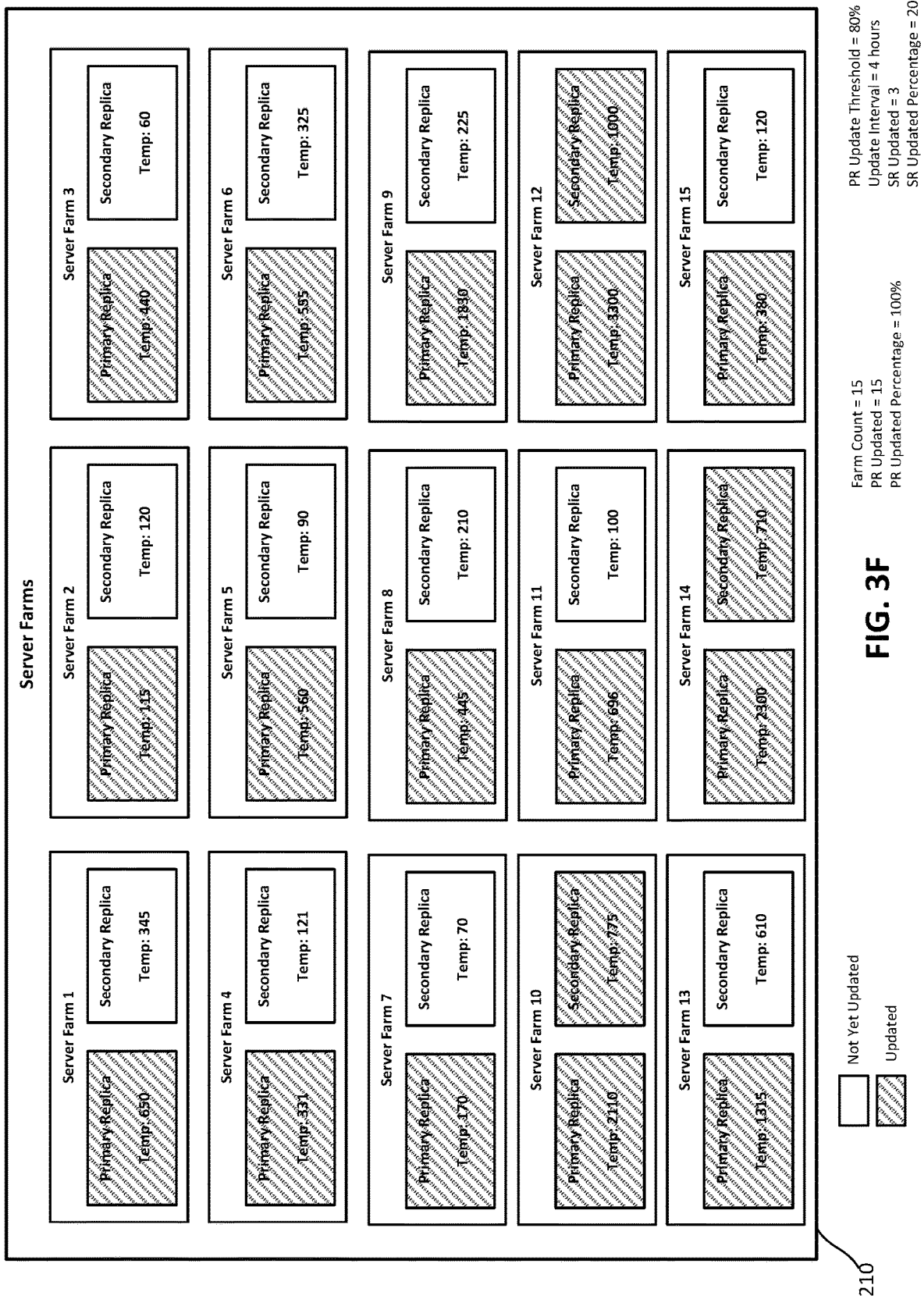

In FIG. 3F, the update deployment unit 225 has deployed the update to primary replica and the disaster recovery replica of server farms 10, 14, and 12, respectively. The deployment threshold was satisfied in the previous stage of the deployment process, and the secondary replicas of the server farms may now be updated along with the primary replicas. The primary replica of 100% of server farms have now been updated and the secondary replicas of 20% of the server farms have also been updated. The update deployment unit 225 then waits for the four hours of the deployment interval before proceeding to the next iteration of the deployment process.

Figure 3G:
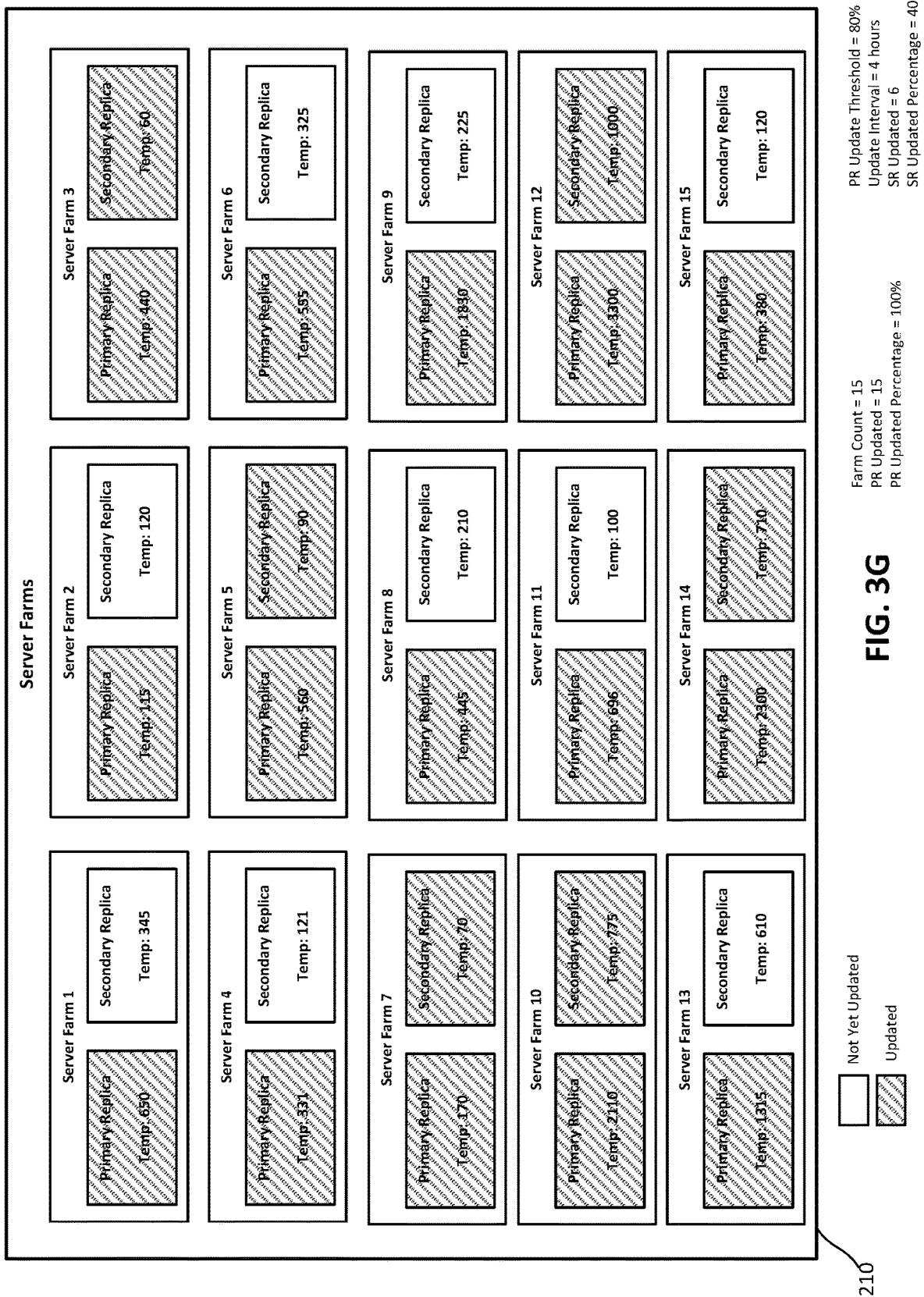

In FIG. 3G, the update deployment unit 225 has deployed the update to disaster recovery replica of server farms 3, 7, and 5, respectively. The update deployment unit 225 selects these three server farms to be updated based on the temperature of the disaster replicas. Once again, the update deployment unit 225 has selected server farms to be updated that had a disaster recovery replica that had not yet been updated and have the lowest temperature. The primary replica of 100% of server farms has now been updated and the secondary replica of 40% of the server farms has also been updated. The update deployment unit 225 then waits for the four hours of the deployment interval before proceeding to the next iteration of the deployment process.

Figure 3H:
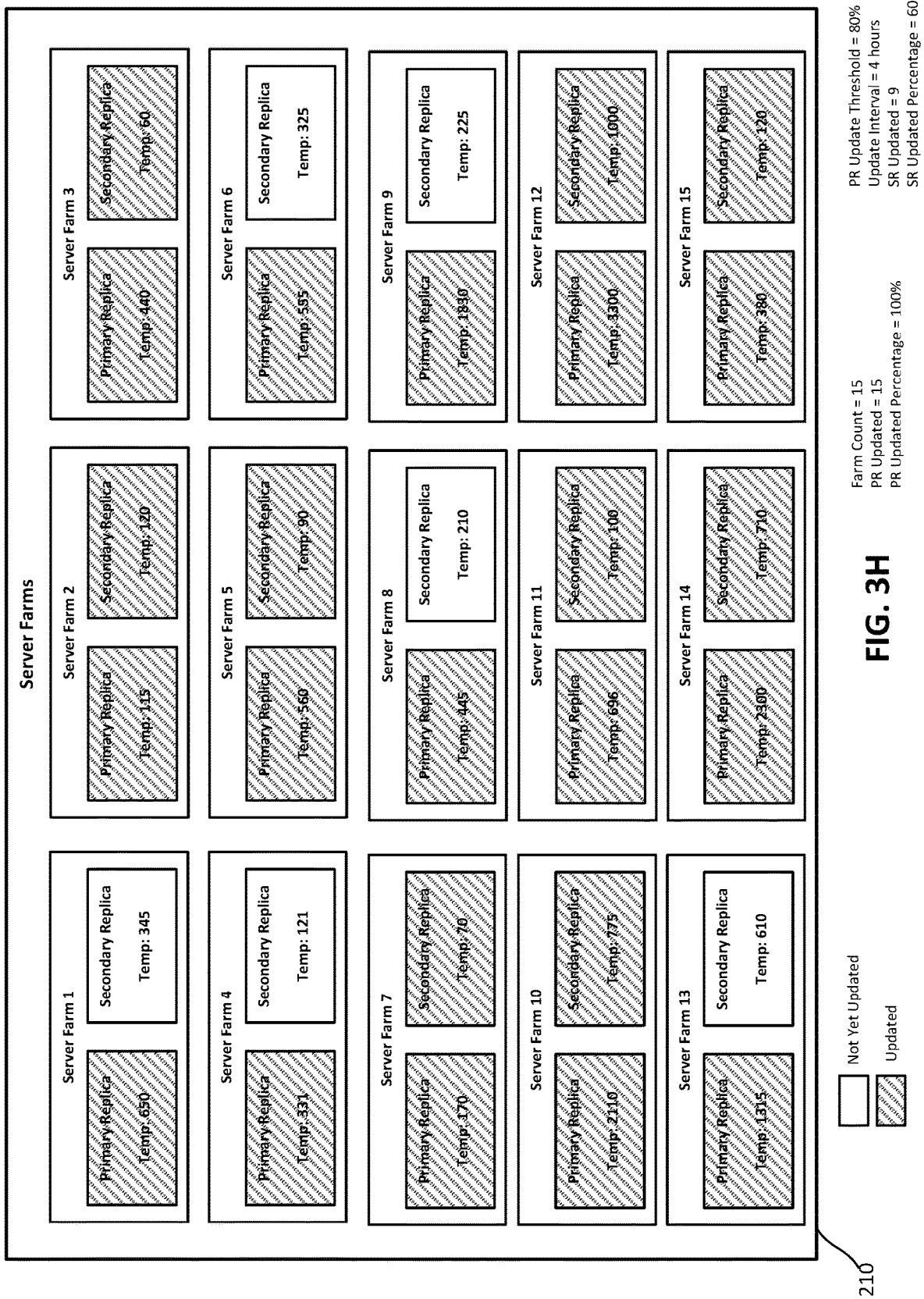

In FIG. 3H, the update deployment unit 225 has deployed the update to disaster recovery replica of server farms 11, 2, and 15, respectively. The updated deployment unit 225 selects these three server farms to be updated based on the temperature of the disaster replicas. Once again, the update deployment unit 225 has selected server farms to be updated having a disaster recovery replica that had not yet been updated and having the lowest temperature. The primary replica of 100% of server farms has now been updated and the secondary replica of 60% of the server farms has also been updated. The update deployment unit 225 then waits for the four hours of the deployment interval before proceeding to the next iteration of the deployment process.

Figure 3I:
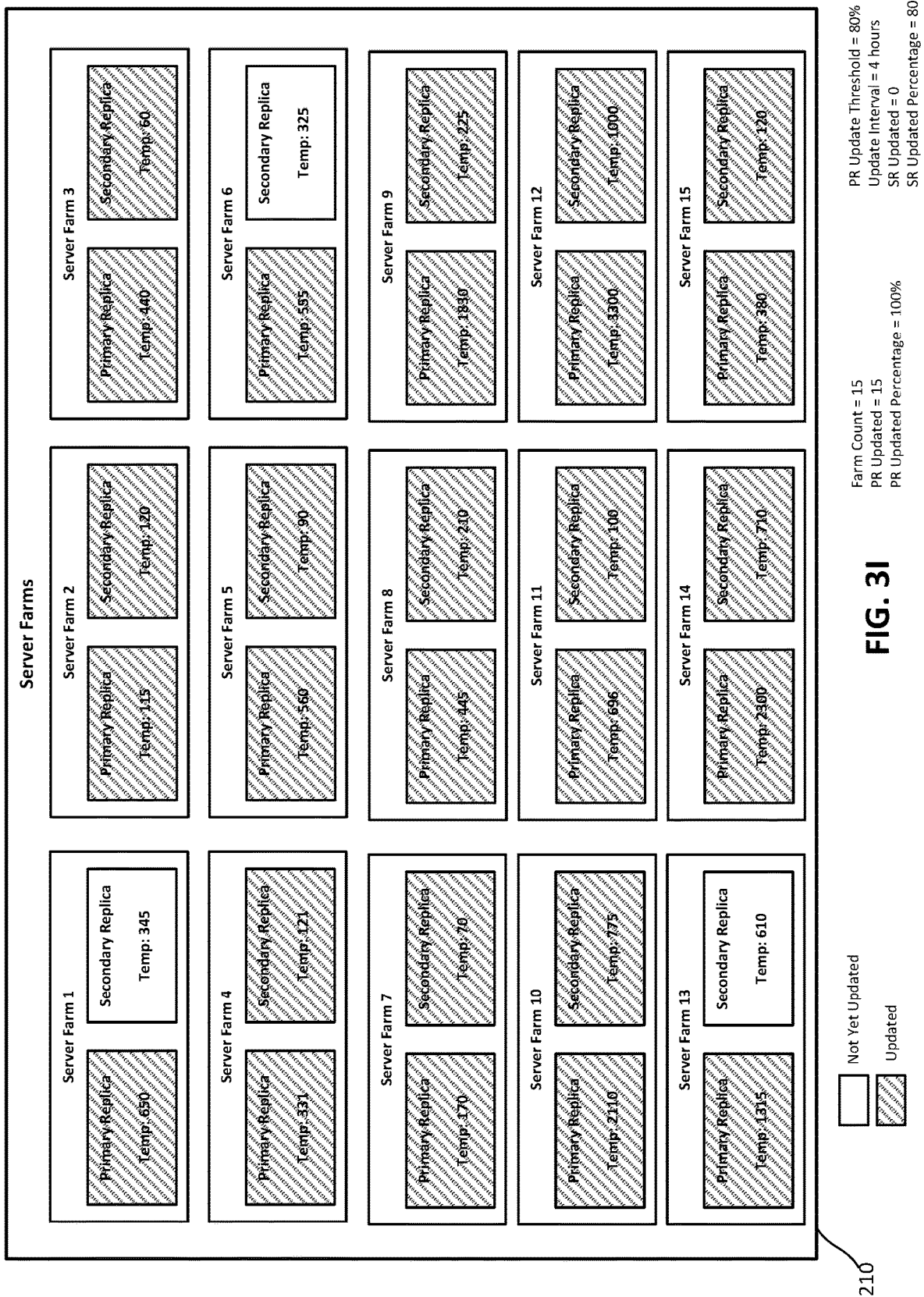

In FIG. 3I, the update deployment unit 225 has deployed the update to disaster recovery replica of server farms 4, 8, and 9, respectively. The update deployment unit 225 selects these three server farms to be updated based on the temperature of the disaster replicas. Once again, the update deployment unit 225 has selected server farms to be updated that had a disaster recovery replica not yet updated and with the lowest temperature. The primary replica of 100% of server farms has now been updated and the secondary replica of 80% of the server farms has also been updated. The update deployment unit 225 then waits for the four hours of the deployment interval before proceeding to the next iteration of the deployment process.

Figure 3J:
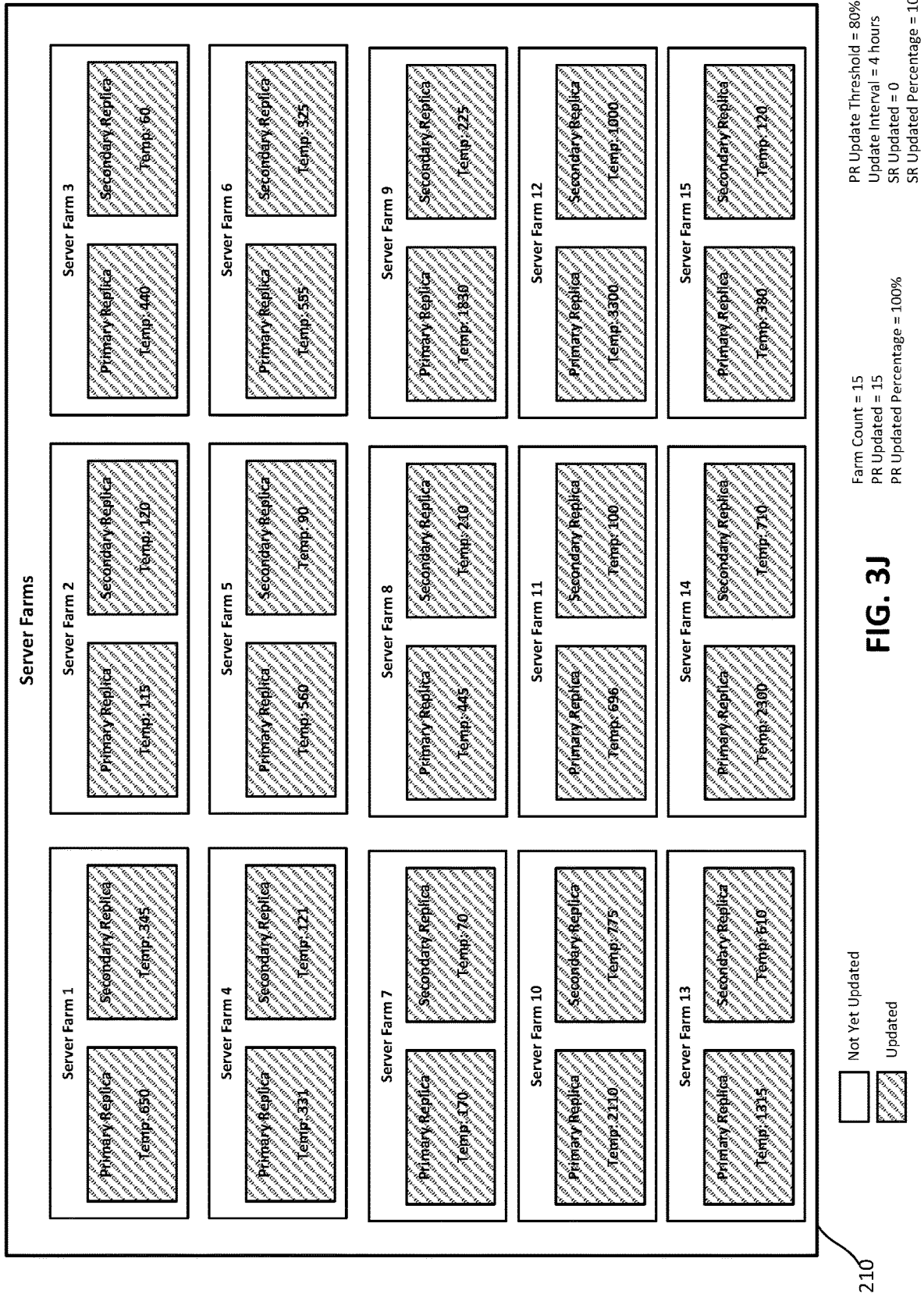

In FIG. 3J, the update deployment unit 225 has deployed the update to disaster recovery replica of server farms 6, 1, and 13, respectively. The update deployment unit 225 has now updated both the primary replica and the secondary replication of 100% of the server farms 210. The update deployment unit 225 may be configured to generate and send a report to one or more administrators that provides an indication that the updates has been completed.

Figure 6:
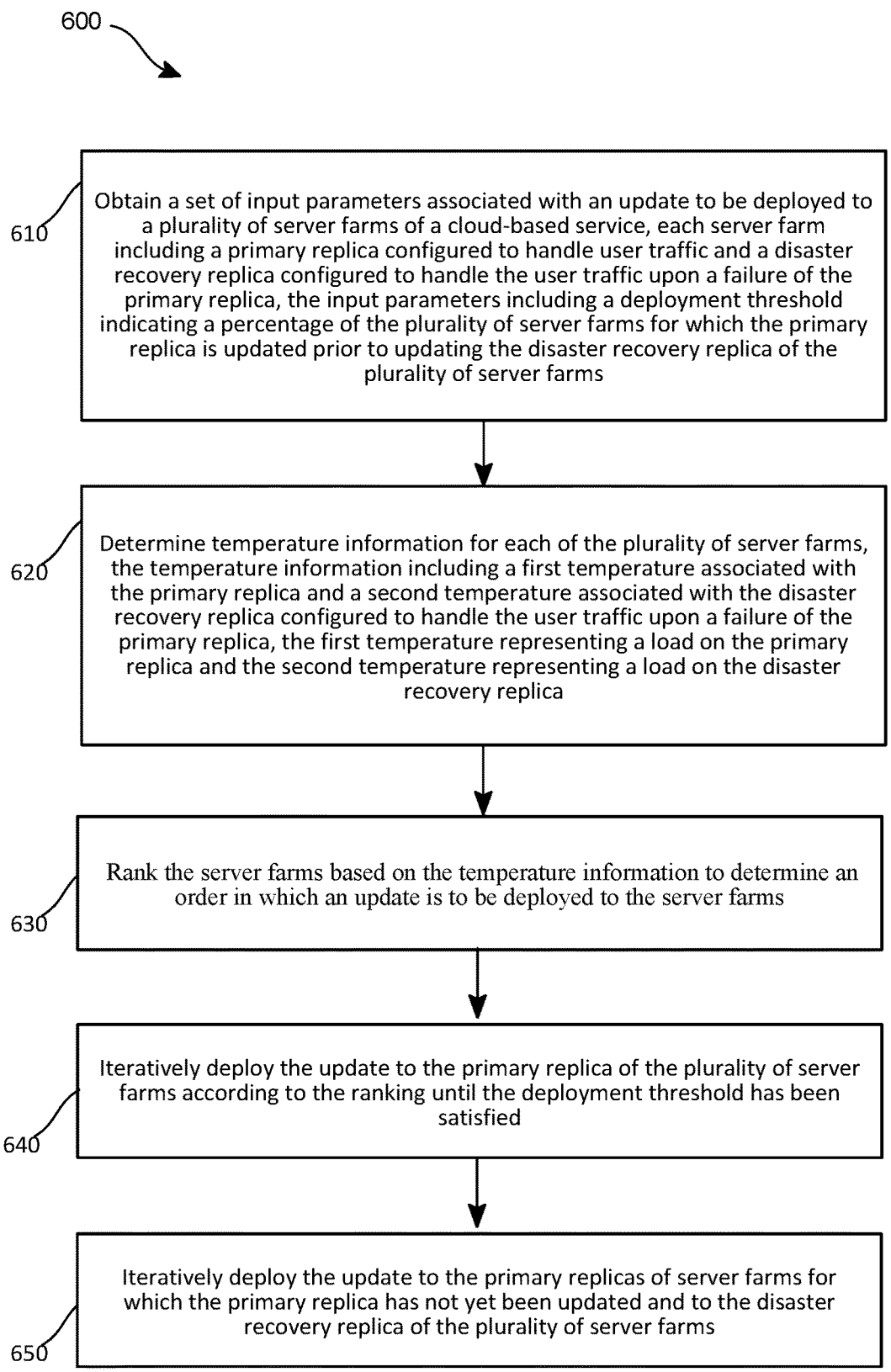
FIG. 6 is a flow diagram of a process for deploying updates to a cloud-based service, such as that shown in the preceding examples.

FIG. 6 is a flow chart of an example process 600. The process 600 may be implemented by the cloud-based service 110. The process 600 may be used to deploy updates to the server farms of the cloud-based service 110. In some implementations, the process 600 may be implement by a deployment service that is separate from the cloud-based service 110.

The process 600 may include an operation 610 of obtaining a set of input parameters associated with an update to be deployed to a plurality of server farms of a cloud-based service. Each server farm including a primary replica configured to handle user traffic and a disaster recovery replica configured to handle the user traffic responsive to a failure of the primary replica. The input parameters including a deployment threshold indicating a percentage of the plurality of server farms for which the primary replica is updated prior to updating the disaster recovery replica of the plurality of server farms. As discussed in the preceding examples, a user may define input parameters, such as the deployment threshold, a deployment increment, and a deployment interval. In some implementations, the user may provide details of update to be deployed and a machine learning model may analyze these details and output a predicted deployment threshold, a deployment increment, and a deployment interval for the update.

The process 600 may include an operation 620 of determining temperature information for each of the plurality of server farms. The temperature information includes a first temperature associated with the primary replica and a second temperature associated with the disaster recovery replica configured to handle the user traffic upon a failure of the primary replica. The first temperature represents a load on the primary replica and the second temperature representing a load on the disaster recovery replica. The update configuration and deployment unit 205 may obtain the temperature information from the farm temperature service unit 235.

The process 600 may include an operation 630 of ranking the server farms based on the temperature information to determine an order in which an update is to be deployed to the server farms. As discussed in the preceding examples, the update configuration and deployment unit 205 may rank the server farms based on the temperature information obtained from the farm temperature service unit 235. An example of such a ranking is shown in FIG. 4. The update configuration and deployment unit 205 may rank the server farms so that the primary replicas having a lowest temperature are updated first. This approach deploys the update to server farms where the primary replica is experiencing less of load. Thus, if there is problem with the update, fewer users may be impacted. Furthermore, the updates are not initially deployed to the disaster recovery replicas of the server farms to ensure that the server farms may route user traffic to the disaster recovery replicas should a problem occur with the updated primary replicas.

The process 600 may include an operation 640 of iteratively deploying the update to the primary replica of the plurality of server farms according to the ranking until the deployment threshold has been satisfied. The update configuration and deployment unit 205 may be configured to deploy the update to the primary replicas of the server farms 210. The order in which the updates are deployed may be based on a ranking of the server farms. An example of such a deployment has been shown in FIGS. 3A-3J.

The process 600 may include an operation 610 of iteratively deploying the update to the primary replicas of server farms for which the primary replica has not yet been updated and to the disaster recovery replica of the plurality of server farms. The update configuration and deployment unit 205 may be configured to continue deploying the update to both the primary replicas that have not yet been updated and to the secondary replicas. An example of such a deployment has been shown in FIGS. 3A-3J.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
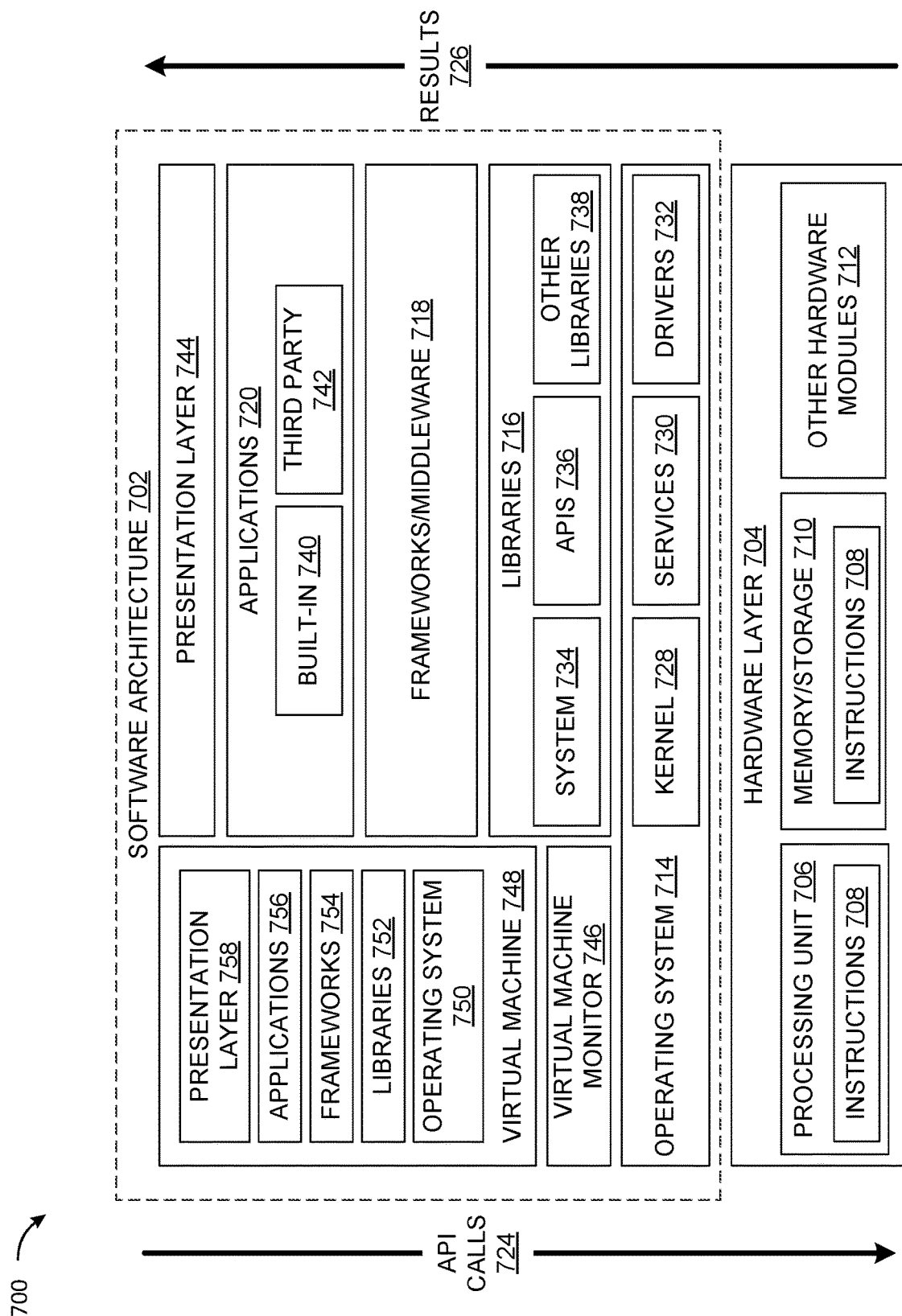
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
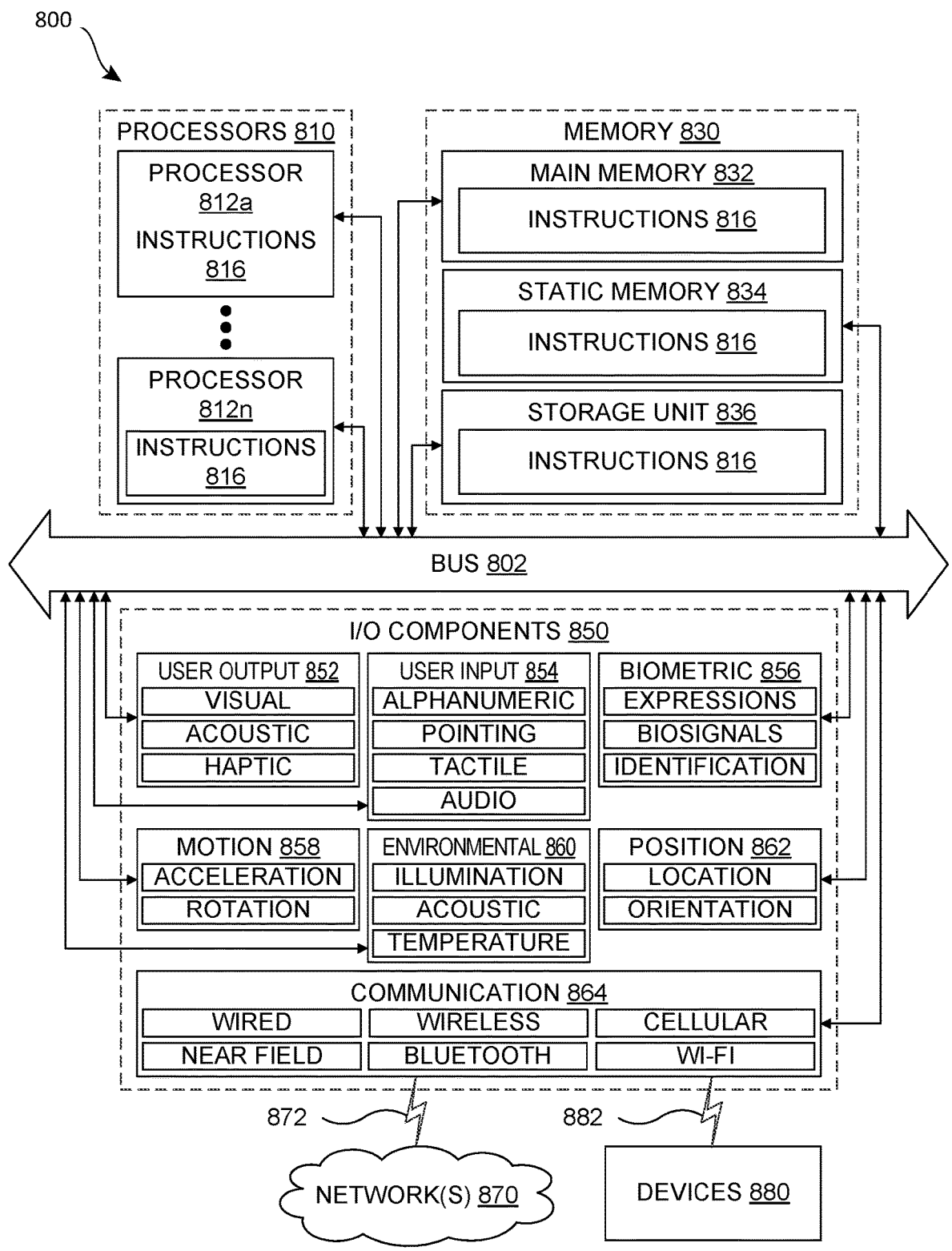
FIG. 8 is a block diagram showing components of an example machine configured to read instructions from a machine-readable medium and perform the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor to perform operations comprising:
   receiving a set of input parameters associated with an update to be deployed to a plurality of server farms of a cloud-based service during a deployment, each server farm including a primary replica configured to handle user traffic and a disaster recovery replica configured to handle the user traffic upon a failure of the primary replica, the set of input parameters including a deployment threshold indicating an optimal number of the plurality of server farms for which the primary replica is updated prior to updating the disaster recovery replica of the plurality of server farms, and a deployment increment indicating a number of server farms to be updated during each phase of a plurality of phases of the deployment, wherein the optimal number is greater than zero and less than a total number of primary replicas in the plurality of server farms;
   storing temperature information for each of the plurality of server farms, the temperature information including a first temperature associated with the primary replica and a second temperature associated with the disaster recovery replica, the first temperature representing a load on the primary replica and the second temperature representing a load on the disaster recovery replica;
   iteratively deploying the update to the primary replica of the plurality of server farms during each phase of the deployment according to a ranking of the plurality of server farms and the deployment increment until the deployment threshold has been satisfied, wherein the ranking is based on the temperature information; and
   after the deployment threshold has been satisfied, iteratively deploying the update to remaining primary replicas of server farms for which the primary replica has not yet been updated along with the disaster recovery replica of the plurality of server farms during subsequent phases of the deployment according to the ranking of the server farms and the deployment increment.

2. The data processing system of claim 1, wherein the temperature information is updated periodically and the deployment increment is changed after the deployment threshold has been satisfied.

3. The data processing system of claim 2, wherein the set of input parameters further include a deployment interval indicating a period to wait between each phase of the deployment.

4. The data processing system of claim 3, the machine-readable medium storing executable instructions that, when executed, further cause the processor to perform operations comprising:
   providing build information as an input to a machine learning model configured to output the deployment threshold, the deployment increment, and the deployment interval, the machine learning model being trained to predict the deployment threshold, the deployment increment, and the deployment interval based on training data representing previous updates deployed to the cloud-based service; and
   receiving the set of input parameters including the deployment threshold, the deployment increment, and the deployment interval from the machine learning model.

5. The data processing system of claim 3, wherein the plurality of server farms having primary replicas with a lower temperature are higher in the ranking than those of server farms having primary replicas with a higher temperature.

6. The data processing system of claim 3, the machine-readable medium storing executable instructions that, when executed, further cause the processor to perform operations comprising:
   after all primary replicas and all disaster recovery replicas have been updated, generating a report and sending the report to one or more administrators indicating that all of the primary replicas and all of the disaster recovery replicas have been updated.

7. A method implemented in a data processing system for deploying updates to a cloud-based service, the method comprising:

receiving a set of input parameters associated with an update to be deployed to a plurality of server farms of a cloud-based service during a deployment, each server farm including a primary replica configured to handle user traffic and a disaster recovery replica configured to handle the user traffic upon a failure of the primary replica, the set of input parameters including a deployment threshold indicating an optimal number of the plurality of server farms for which the primary replica is updated prior to updating the disaster recovery replica of the plurality of server farms, and a deployment increment indicating a number of server farms to be updated during each phase of a plurality of phases of the deployment, wherein the optimal number is greater than zero and less than a total number of primary replicas in the plurality of server farms;

storing temperature information for each of the plurality of server farms, the temperature information including a first temperature associated with the primary replica and a second temperature associated with the disaster recovery replica, the first temperature representing a load on the primary replica and the second temperature representing a load on the disaster recovery replica;

iteratively deploying the update to the primary replica of the plurality of server farms during each phase of the deployment according to a ranking of the plurality of server farms and the deployment increment until the deployment threshold has been satisfied, wherein the ranking is based on the temperature information; and after the deployment threshold has been satisfied, iteratively deploying the update to remaining primary replicas of server farms for which the primary replica has not yet been updated along with the disaster recovery replica of the plurality of server farms during subsequent phases of the deployment according to the ranking of the server farms and the deployment increment.

8. The method of claim 7, wherein the temperature information is updated periodically and the deployment increment is changed after the deployment threshold has been satisfied.

9. The method of claim 8, wherein the set of input parameters further include a deployment interval indicating a period to wait between each phase of the deployment.

10. The method of claim 9, further comprising:

providing build information as an input to a machine learning model configured to output the deployment threshold, the deployment increment, and the deployment interval, the machine learning model being trained to predict the deployment threshold, the deployment increment, and the deployment interval based on training data representing previous updates deployed to the cloud-based service; and receiving the set of input parameters including the deployment threshold, the deployment increment, and the deployment interval from the machine learning model.

11. The method of claim 7, wherein the plurality of server farms having primary replicas with a lower temperature are higher in the ranking than those of server farms having primary replicas with a higher temperature.

12. The method of claim 8, further comprising:

after all primary replicas and all disaster recovery replicas have been updated, generating a report and sending the report to one or more administrators indicating that all primary replicas and all disaster recovery replicas have been updated.

13. A machine-readable medium on which are stored instructions that, when executed, cause a processor of a programmable device to perform operations of:

receiving a set of input parameters associated with an update to be deployed to a plurality of server farms of a cloud-based service during a deployment, each server farm including a primary replica configured to handle user traffic and a disaster recovery replica configured to handle the user traffic upon a failure of the primary replica, the set of input parameters including a deployment threshold indicating an optimal number of the plurality of server farms for which the primary replica is updated prior to updating the disaster recovery replica of the plurality of server farms, and a deployment increment indicating a number of server farms to be updated during each phase of a plurality of phases of the deployment, wherein the optimal number is greater than zero and less than a total number of the primary replicas in the plurality of server farms;

storing temperature information for each of the plurality of server farms, the temperature information including a first temperature associated with the primary replica and a second temperature associated with the disaster recovery replica, the first temperature representing a load on the primary replica and the second temperature representing a load on the disaster recovery replica;

iteratively deploying the update to the primary replica of the plurality of server farms during each phase of the deployment according to a ranking of the server farms and the deployment increment until the deployment threshold has been satisfied, wherein the ranking is based on the temperature information; and after the deployment threshold has been satisfied, iteratively deploying the update to remaining primary replicas of server farms for which the primary replica has not yet been updated along with the disaster recovery replicas of the plurality of server farms during subsequent phases of the deployment according to the ranking of the server farms and the deployment increment.

14. The machine-readable medium of claim 13, wherein the temperature information is updated periodically and the deployment increment is changed after the deployment threshold has been satisfied.

15. The machine-readable medium of claim 14, wherein the set of input parameters further include a deployment interval indicating a period to wait between each phase of the deployment.

16. The machine-readable medium of claim 15, storing instructions that, when executed, cause the processor of the programmable device to further perform operations of:

providing build information as an input to a machine learning model configured to output the deployment threshold, the deployment increment, and the deployment interval, the machine learning model being trained to predict the deployment threshold, the deployment increment, and the deployment interval based on training data representing previous updates deployed to the cloud-based service; and receiving the set of input parameters including the deployment threshold, the deployment increment, and the deployment interval from the machine learning model.

17. The machine-readable medium of claim 13, wherein the plurality of server farms having primary replicas with a lower temperature are higher in the ranking than those of server farms having primary replicas with a higher temperature.

\* \* \* \* \*